United States Patent
Wang

(10) Patent No.: US 6,418,258 B1
(45) Date of Patent: Jul. 9, 2002

(54) MICROSTRUCTURED OPTICAL FIBER WITH IMPROVED TRANSMISSION EFFICIENCY AND DURABILITY

(75) Inventor: Shih-Yuan Wang, Palo Alto, CA (US)

(73) Assignee: Gazillion Bits, Inc., San Jose, CA (US)

( * ) Notice: Subject to any disclaimer, the term of this patent is extended or adjusted under 35 U.S.C. 154(b) by 47 days.

(21) Appl. No.: 09/591,474

(22) Filed: Jun. 9, 2000

(51) Int. Cl.[7] .................................................. G02B 6/02
(52) U.S. Cl. ........................ 385/125; 385/123; 385/124; 385/126
(58) Field of Search ................................. 385/123, 124, 385/125, 126, 127, 128, 129

(56) References Cited

U.S. PATENT DOCUMENTS

| 5,155,792 A | | 10/1992 | Vali et al. ................... 385/125 |
| 5,802,236 A | * | 9/1998 | DiGiovanni et al. ......... 385/127 |
| 5,907,652 A | * | 5/1999 | DiGiovanni et al. ......... 385/125 |
| 6,097,870 A | * | 8/2000 | Ranka et al. ............... 385/127 |

FOREIGN PATENT DOCUMENTS

WO     WO9964903     12/1999

OTHER PUBLICATIONS

Russell, Knight, Birks, Mangan, and Wadsworth, Recent Progress in Photonic Crystal Fibres, ThG1–1—ThG–3, 980100, Optical Fiber Communication Conference, 2000, Technical Digest Series, Conference Edition, Baltimore, Maryland, Mar. 7–10, 2000 (Optical Society of America).

Monro, Bennett, Broderick, and Richardson, "New Possibilities with Holey Fibers," ThG4–1—ThG4–3, 106–108 Optical Fiber Communication Conference, 2000, Technical Digest Series, Conference Edition, Baltimore, Maryland, Mar. 7–10, 2000 (Optical Society of America).

Windeler and Ranka, "Novel Properties of Air–Silica Microstructure Optical Fibers," ThG3–1—ThG3–2, 104–105 Optical Fiber Communication Conference, 2000, Technical Digest Series, Conference Edition, Baltimore, Maryland, Mar. 7–10, 2000 (Optical Society of America).

Broeng, Barkou, and Bjarkley, "Polarization Properties of Photonic Bandgap Fibers," ThG2–1—ThG2–3, 101–103 Optical Fiber Communication Conference, 2000, Technical Digest Series, Conference Edition, Baltimore, Maryland, Mar. 7–10, 2000 (Optical Society of America).

\* cited by examiner

*Primary Examiner*—Phan T. H. Palmer
(74) *Attorney, Agent, or Firm*—Cooper & Dunham LLP

(57) ABSTRACT

An index-guiding optical fiber having a plurality of elongated void regions in the core and cladding is described. The void regions are preferably filled with air, vacuum, or an inert gas. The percentage of void area in the core region is less than in the cladding region, whereby the cladding region has a lower effective index of refraction than the core region, allowing for propagation of light waves by an index-guiding effect. Because the light waves "see" less glass material as they propagate down the longitudinal axis of the fiber, there is increased transmission efficiency. Individual microstructural features in the core and cladding are kept very small as compared to the wavelength of the light being transmitted. This results in more uniformly distributed refractive indices, and also provides for increased durability and robustness against external bending, pinching, or squeezing of the optical fiber. Air voids are intermittently sealed off along the longitude of the fiber to prevent capillary-effect flooding in the event of accidental introduction of water, water vapor, or other fluid into the fiber.

35 Claims, 4 Drawing Sheets

MICROSTRUCTURED OPTICAL FIBER WITH IMPROVED TRANSMISSION EFFICIENCY AND DURABILITY

FIELD

This patent specifcaton relates to the field of optical fibers. More particularly, it relates to a microstructured optical fiber that allows for improved transmission efficiency and physical durability in fiber optic communication applications.

BACKGROUND

Advances in fiber optics technologies have made optical fiber communications the method of choice in the transmission of high bit-rate digital data over long distances. A conventional optical fiber is essentially an optical waveguide having an inner core and an outer cladding, the cladding having a lower index of refraction than the core. Because of the difference in refractive indices, the optical fiber is capable of confining light that is axially introduced into the core and transmitting that light over a substantial distance. Because they are able to guide light due to total internal reflection principles, conventional optical fibers are sometimes referred to as index-guiding fibers. Conventional optical fibers are made of fused silica, with the core region and the cladding region having different levels of dopants (introduced impurities) to result in the different indices of refraction. The cladding is usually doped to have a refractive index that ranges from 0.1% (single mode fibers) to 2% (multi-mode fibers) less than the refractive index of the core, which itself usually has a nominal refractive index of 1.47.

Conventional optical fibers have a solid cross-section. As light travels through the solid fused silica material, it is subject to several adverse effects that reduce the efficiency of information transfer and the practical distance over which information may be carried by the light. These effects include attenuation or loss (reduction in signal magnitude), dispersion (chromatic, waveguide and modal), miscellaneous nonlinearities (such as stimulated Raman scattering, stimulated Brillouin scattering, and optically induced birefringence), and other adverse effects.

Although the light is being transmitted through many meters or kilometers of solid material, relatively low losses can be experienced at certain wavelengths of light. Conventional fibers today, for example, have attenuations as low as 0.25 dB/km at 1550 nm—about 1% of the light entering the fiber still remains after 80 km. Using today's amplifier and detector technologies, this allows signals to go through more than 100 km of fiber without amplification, an important advantage in long distance communications. Nevertheless, it would be desirable to even further minimize the above mentioned adverse effects in optical fibers, for increasing the efficiency and reducing the cost of fiber optic communications.

Another problem that arises in conventional optical fibers relates to the physical durability and robustness of the optical fiber itself. A variety of outside influences can change the physical characteristics of optical fibers and affect how they guide light. As a first example, the bending of an optical fiber into tight loops or other tightly curved shapes may cause the unwanted propagation of microcracks in the fused silica structure. Upon such bending of the fiber, the microcracks can become larger and extend across a substantial portion of the cross-section of the optical fiber, rendering it inoperable. As a second example, external forces may squeeze or pinch the outside surface of an optical fiber, such as when a fiber is tightly pulled around a sharp corner. Upon such squeezing or pinching, the structure of the fused silica material inside the fiber may contort slightly. This can cause unwanted polarization effects in the light being transmitted through the fiber, also reducing the fiber's capacity or rendering it inoperable. Accordingly, it would be desirable to provide a fiber optic structure that is more robust to external bending, pinching, or squeezing of the fiber optic.

As described by Broeng et. al. in WO9964903, recent developments in optical fiber technology have been introduced by way of microstructured photonic bandgap (PBG) fibers. In contrast to conventional optical fibers in which a high-index core is surrounded by a low-index cladding, PBG fibers comprise a low-index (or even hollow) core surrounded by a higher-index cladding that contains carefully placed air voids. The air voids run longitudinally, parallel to the central axis of the fiber. When the air voids are placed in the cladding such that a cross-section of the fiber has a specific, predetermined, periodic pattern of air voids, a photonic bandgap (PBG) effect may be achieved. When the PBG effect is achieved, the cladding structure is capable of completely reflecting certain wavelengths of light at certain incident angles, and is thereby capable of confining the light to a region surrounded by the cladding structure for propagation down the length of the fiber. The PBG effect is achieved even though the refractive index within the region of confinement may be lower than that of the surrounding cladding structure.

PBG fibers, however, contain a crucial shortcoming in that proper operation is based on an interference effect. This is in contrast to conventional index-guiding fibers that guide due to total internal reflection. Because they depend on an interference effect, PBG fibers are extremely sensitive to even slight variations in the locations of the air voids in the cladding. Substantial deterioration in performance may take place if even one of the air voids is slightly misplaced. Even if properly manufactured to exacting tolerances, slight variations in the relative air void positions might be incurred due to external twisting, pinching, or squeezing that slightly deforms the fiber optic structure. This, in turn, may lead to drastic performance decreases. Accordingly, PBG fibers are not used today in practical fiber optic communication systems, although they continue to be the subject of laboratory research.

Another type of optical fiber having longitudinal air voids is presented in U.S. Pat. No. 5,802,236 to DiGiovanni et al., hereby incorporated by reference herein. The '236 patent discloses a microstructured optical fiber comprising a solid core region surrounded by a cladding region having a plurality of air voids. In contrast to PBG fiber in which careful periodic spacing of the air voids is required, the air voids of the '236 patent are not required to be periodic. The optical fiber of the '236 patent relies on index-guiding, and not on the PBG effect, to propagate the light down the fiber, the index-guiding effect being achieved when the effective refractive index of the cladding is less than that of the core. According to the '236 patent, because a portion of the cross-sectional area of the cladding is occupied by air voids, the effective index of refraction of the cladding region will be less than that of the core, and index-guiding will be achieved. Roughly speaking, the effective index of refraction of the cladding will be an average of the refractive index of air and the refractive index of the fused silica material, weighted according to the percentage of cross-sectional area occupied by each.

FIG. 1 illustrates a cross-sectional view of an optical fiber 100 similar to that disclosed in the '236 patent and having dimensions as described in the '236 patent. Optical fiber 100 comprises a core region 102 surrounded by a cladding region 104. The core region 102 is solid glass material. The cladding region 104 is solid glass material surrounding a plurality of air-void cladding features, in particular, first cladding features 106 and second cladding features 108. The first cladding features 106 are positioned such that the inscribed diameter of core region 102 is 1.017 $\mu$m. The first cladding features 106 each have a diameter of 0.833 $\mu$m, while the second cladding features 108 each have a diameter of 0.688 $\mu$m, the cladding features all having a center-to-center spacing of 0.925 $\mu$m.

Although it is less dependent on precise air void spacing, thereby resolving a problem presented by PGB fibers, the optical fiber 100 of the '236 patent itself has shortcomings. First, because the core region 102 is solid glass material, the propagating light waves still "see" a substantial amount of glass as they travel down the fiber, and thereby still experience the loss, nonlinearities, etc., associated with travelling through that much glass material. Second, the first and second cladding features 104 and 106 have dimensions that are substantial fractions of the 1.55 $\mu$m wavelength of light to be carried by the fiber 100 (54% and 44%, respectively, of the 1.55 $\mu$m wavelength in vacuum, or 81% and 67%, respectively, of the 1.033 $\mu$m wavelength in silica glass having a refractive index of 1.5.). In such case, the effective index of refraction may not be sufficiently uniform around any given circle at a given radius from the center, causing unwanted polarization, losses, or other undesired effects. Furthermore, because the air voids are relatively large and leave a substantial amount of solid glass in the cross section, the optical fiber 100 is still subject to microcrack propagation and unwanted polarizations that may be induced by external bending, pinching, or squeezing of the optical fiber. Finally, the capillaries formed by the air voids run continuously through the fiber from end-to-end. In practical installations in which water or other fluid might accidentally enter the optical fiber at a single point, there is nothing to prevent catastrophic failure of the optical fiber due to flooding of entire capillaries.

Accordingly, it would be desirable to provide an improved optical fiber having reduced signal attenuation for increased efficiency in long-distance fiber optic communications.

It would be further desirable to provide an optical fiber having reduced dispersion effects and nonlinear effects for increased efficiency in long-distance fiber optic communications.

It would be still further desirable to provide an improved fiber optic structure that is more robust than prior art fibers to external bending, pinching, or squeezing of the fiber optic cable.

It would be even further desirable to provide, in a microstructured optical fiber having capillaries formed by air voids, a structural improvement that prevents catastrophic flooding of the optical fiber upon accidental introduction of fluid into the fiber at a given point.

Other desirable features, effects and results will become apparent from the disclosure below.

SUMMARY

In accordance with a preferred embodiment, a microstructured optical fiber is provided comprising a core region and a cladding region, the core region being made of a core material such as fused silica into which is formed a plurality of void regions that are elongated and parallel to a center longitudinal axis. The void regions are preferably filled with air, vacuum, or an inert gas, but may be filled a variety of liquids or solids. When the core region is viewed in cross-section, the void regions occupy a substantial first percentage of the area of the core region. The cladding region is likewise made of a cladding material, which is usually the same as the core material, into which is formed a plurality of void regions that are elongated and parallel to the center longitudinal axis. When the cladding region is viewed in cross-section, the void regions occupy a substantial second percentage of the area of the cladding region. In accordance with a preferred embodiment, the first percentage of void area in the core region is less than the second percentage of void area in the cladding region, whereby the cladding region has a lower effective index of refraction than the core region. This effective refractive index difference allows for propagation of light waves through the optical fiber by an index-guiding effect.

In a preferred embodiment, there is an approximately greater than 1:1 ratio of void area to material area in both the core region and cladding region of the microstructured optical fiber. Because the light waves "see" (or interact with) less glass material as they propagate down the longitudinal axis of the fiber, there is increased transmission efficiency as compared to conventional index-guiding optical fibers in the form of reduced signal attenuation, reduced dispersion effects, and reduced nonlinear effects.

According to a preferred embodiment, microstructural dimensions in the core and cladding are kept very small as compared to the wavelength of light. For propagation of 1.55 $\mu$m (micrometer) light, for a substantial length (over 99%) of the optical fiber, the average cross-sectional dimension of the void regions preferably should be no greater than 0.1 $\mu$m, which is less than one-tenth of the wavelength, and no substantial number of void regions should have a cross-sectional dimension greater than 0.3 $\mu$m. These dimensions are preferred due to the detrimental effects of large void sizes, such as non-uniform distribution of the effective refractive index and greater index variations due to the large void sizes, which may result in optical modal variations. However, for certain portions of the fiber, at points of slicing or the beginning or the end of the fiber, large voids may be introduced to change the modal pattern of the light in the fiber for mode matching to other optical elements. Advantageously, due to the small microstructural dimensions of the preferred embodiments, the incident light waves "see" a uniformly distributed effective index of refraction at any particular location of the fiber, thereby avoiding adverse effects due to localized variations that can occur with the larger microstructural dimensions of the prior art. The cross-sectional positioning of the void regions may be amorphous or periodic, provided that the effective index of refraction is uniformly distributed at any particular location. The microstructured optical fiber may comprise a sets of capillary-like tubes or other structures that are bundled together, or may alternatively comprise a unitary piece of fused silica or other fiber optic material into which the void regions are etched out.

In addition to having increased transmission efficiency, a microstructured optical fiber in accordance with the preferred embodiments exhibits improved physical durability and robustness. Because of the very small size of the void regions, and the accordingly higher spatial density of voids, if the optical fiber is pinched or squeezed at a given point, the outer void regions preferably will deform to absorb the pinching pressure and leave the inner voids substantially unchanged. This preferably will avoid unwanted polarizations or other adverse effects exhibited by solid fused silica when subjected to such stresses in conventional optical fibers. Moreover, the small void regions serve to mechanically inhibit the propagation of microcracks into the cladding or core from the outer perimeter of the fiber, providing increased robustness to external bending of the optical fiber.

Further physical durability is achieved where, in accordance with a preferred embodiment, the void regions are intermittently pinched off in their longitudinal directions as part of their manufacturing process. This prevents capillary-effect flooding of the optical fiber if there is an unintended introduction of water, water vapor, or other fluid or fluid vapor into the fiber. In accordance with a preferred embodiment, the longitudinal positionings of the intermittent pinches are randomly distributed among the void regions, such that light waves propagating down the fiber are not substantially affected by the presence of the intermittent pinches in the air voids. In accordance with an alternative embodiment, the longitudinal positionings of the intermittent pinches may be distributed in a periodic fashion such that reflections would be reduced by interference effects.

DETAILED DESCRIPTION

Figure 1:
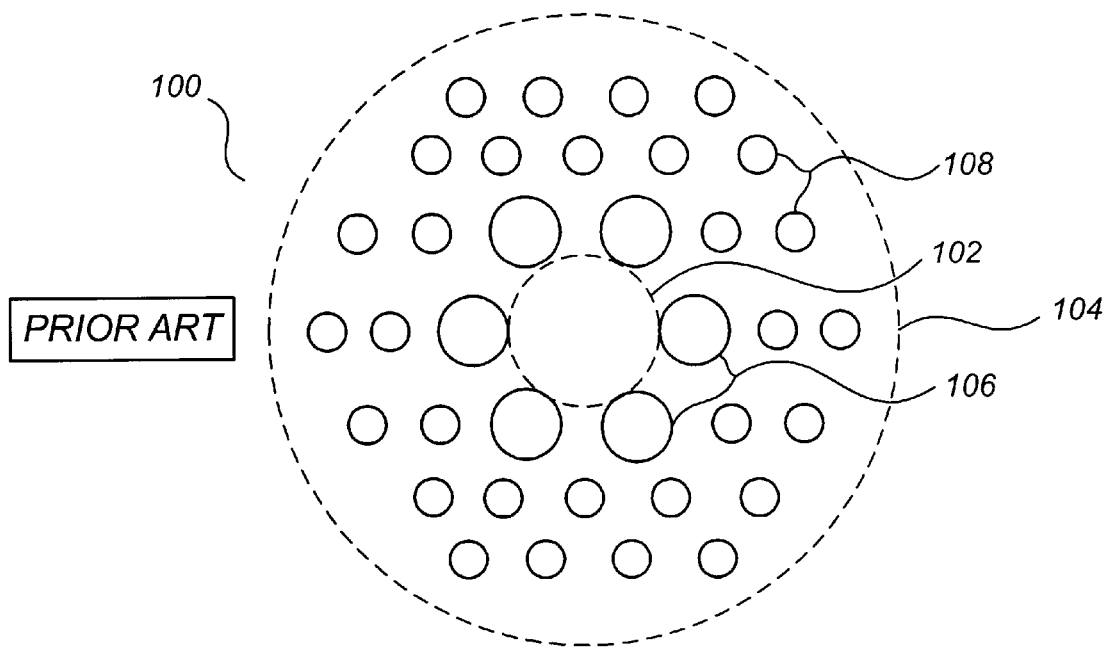
FIG. 1 illustrates a prior art optical fiber microstructure.
Figure 2:
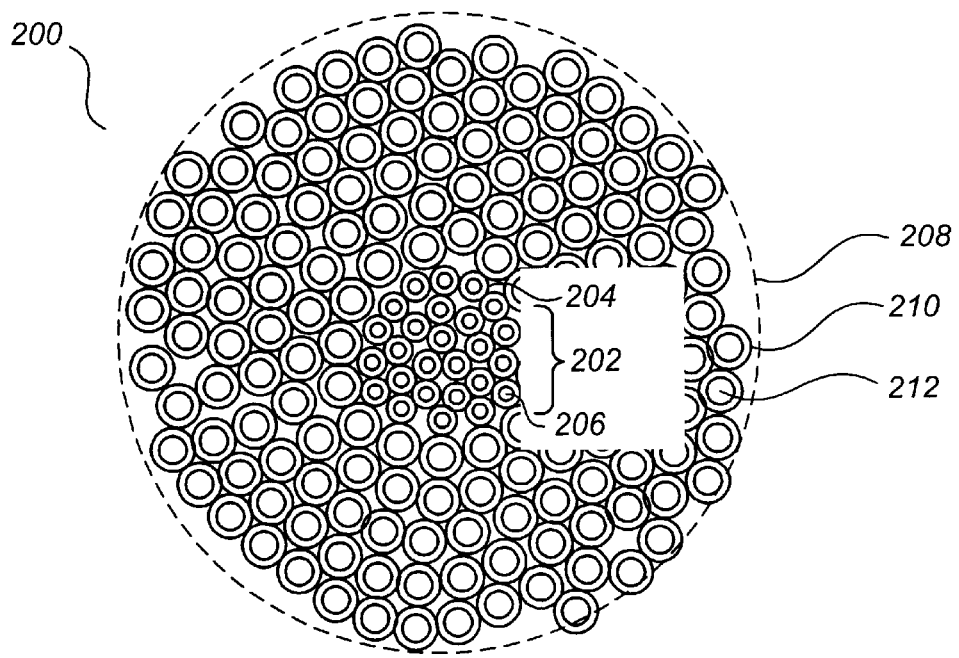
FIG. 2 illustrates a cross-section of a microstructured step-index optical fiber in accordance with a preferred embodiment.

FIG. 2 illustrates a cross-section of a microstructured fiber 200 in accordance with a preferred embodiment. Microstructured fiber 200 comprises a core region 202 comprising a plurality of adjacent tubular structures 204 made of fused silica or other suitable fiber optic material. The tubular shape of the individual structures 204 in FIG. 2 is presented by way of example only, it being understood that any of a variety of shaped structures (e.g. squares, hexagons, other polygons, solid material with etched voids, etc) may be used in accordance with the preferred embodiments. As illustrated in FIG. 2, a plurality of void regions 206 are created in the core by virtue of the shape of the tubular structures 204, including inner void regions contained within each tubular structure and outer void regions formed by the gaps between neighboring structures. The void regions 206, which include the gaps between neighboring tubular structures as necessary, are preferably filled with air, vacuum, or an inert gas, but may be filled a variety of liquids or solids provided that the collective index of refraction of the of the cladding region is less than the collective index of refraction of the core region. (For the purpose of this patent specification, vacuum is referred to as a "material.") For example, selected tubes can be filled such that there may be may be a higher index locally in the cladding but collectively a lower index than the core. By choice of different elongated shapes for the structures 204, such as hexagonal shapes, the outer void regions between neighboring structures can be substantially eliminated. The outer void regions may alternatively be collapsed when the tubular or other structures are fused together in the manufacturing process. It is to be understood that more layers and structures are involved in an actual manufactured fiber such as hermetic sealant coatings, additional layers/structures to give the fiber strength, etc. For simplicity and clarity of disclosure, however, only the basic light-guiding elements of the optical fiber, i.e., the core and cladding regions, are shown.

Microstructured fiber 200 further comprises a cladding region 208 surrounding the core region 202, the cladding region likewise comprising a plurality of adjacent tubular structures 210 made of fused silica or other suitable fiber optic material. The tubular shape of the cladding structures 210 in FIG. 2 is likewise presented by way of example only, it being understood that any of a variety of shaped structures may be used. Furthermore, the shape of the cladding structures 210 may be different than the shape of the core structures 204 without departing from the scope of the preferred embodiments. A plurality of void regions 212 in the cladding region are formed by virtue of the shape of the tubular structures 210. The void regions 212 of the cladding will usually be filled in the same manner as the void regions 206 of the core, although they may be filled with different material without departing from the scope of the preferred embodiments. For simplicity and clarity of disclosure, the void regions will be presumed to be filled with air herein, whereas in practice it may be filled with an inert gas.

In order to achieve an index-guiding effect, the core structures 204 are dimensioned and positioned such that a first percentage of the cross-sectional area of the core region 202 is occupied by air, whereas a second cross-sectional area of the cladding region 208 is occupied by air, with the second percentage being greater than the first percentage. In this manner, the cladding region will have a lower effective index of refraction than the core region. This effective refractive index difference allows for propagation of light waves through the optical fiber 200 by an index-guiding effect.

According to a preferred embodiment, the size of the microstructures (e.g., the tubular elements of FIG. 2) in the core region 202 and cladding region 208 are kept very small as compared to the wavelength of light. It has been determined that for propagation of 1.55 $\mu$m light, for example, for a substantial length (such as over 99%) of the fiber, the average cross-sectional dimension of the tubular structures 204 and 210 void regions should preferably be no greater than 0.1 $\mu$m, and no substantial number of void regions should have a cross-sectional dimension greater than 0.3 $\mu$m. When the optical fiber is outfitted with microstructural dimensions of such small size, the incident light waves "see" a uniformly distributed effective index of refraction at any particular location of the fiber, thereby avoiding adverse effects due to localized variations that can occur with the larger microstructural dimensions of the prior art.

Microstructured fiber 200 may be configured and dimensioned to be either single-mode or multimode depending on the selected dimensions of the core region 202, the core structures 204, and the cladding structures 210. By way of non-limiting example, for single-mode operation at a light wavelength of 1.55 $\mu$m, the following dimensions may be used. The core region 202 may have a diameter of 8 $\mu$m, while the cladding region 208 may have a diameter of 125 $\mu$m. Each core tubular structure 204 may have an inside diameter of 0.05 $\mu$m and an outside diameter of 0.1 $\mu$m, with each cladding tubular structure 210 having an inside diameter of 0.052 μm and an outside diameter of 0.102 μm. As indicated by the magnitudes of the above numbers, it is to be appreciated that, for clarity of disclosure, the figures provided are not drawn to scale.

Using the above dimensions, and assuming minimal air gap between tubular structures as may occur in the fiber bundling process, the following light guiding characteristics are realized. It is to be appreciated that these characteristics are presented by way of initial approximation only, and that one skilled in the art would use these initial approximations as a starting point in deriving the precise performance characteristics from computer simulations using methods known in the art, whereby the specific structural configurations and dimensions would be empirically perfected in an iterative fashion. As a first approximation, the effective index of refraction of each region will be an average of the refractive index of air and the refractive index of the fused silica material, weighted according to the percentage of cross-sectional area occupied by each. In particular, if A is the cross-sectional area occupied by silica glass and B is the cross-sectional area occupied by air, then the effective index of refraction $\eta_{\mathit{eff}}$ is given by Eq. (1):

$$\eta_{\mathit{eff}} = [A/(A+B)]\eta_{\mathit{silica}} + [B/(A+B)]\eta_{\mathit{air}} \quad \{1\}$$

Using an index of refraction of 1.0 for air and 1.5 for fused silica, the core region 202 is computed to have an effective refractive index $\eta_{\mathit{core}}$ equal to (75%)(1.5)+(25%)(1.0)= 1.375. The cladding region 208 is computed to have an effective refractive index $\eta_{\mathit{clad}}$ equal to (74.01%)(1.5)+ (25.99%)(1.0)=1.3701, for a refractive index difference of 0.356%. This 0.356% difference in the effective refractive indices will provide for an index-guiding effect for propagating light waves down the fiber.

To a rough approximation, the optical fiber 200 with the above dimensions will have a numerical aperture as computed in Eq. (2):

$$NA = \sqrt{(\eta_{\mathit{core}}^2 - \eta_{\mathit{clad}}^2)} = \sqrt{(1.375^2 - 1.3701^2)} = 0.116 \quad \{2\}$$

The optical fiber 200 having a numerical aperture of 0.116 will have a half-acceptance angle of 6.66 degrees. As known in the art, for a step-index fiber to have single-mode operation, it must have a V-number that is less than or equal to 2.405, where V is given by the equation $V=(2\pi)(\alpha)(NA)/(\lambda)$, where "α" is the radius of the core and λ is the free-space wavelength. Using the above numbers, it is readily computed that V=1.88 for the above case, and therefore the fiber is expected to be a single-mode fiber at 1.55 μm wavelength. Note that V=2.243 for 1.3 μm wavelength and is also single mode, whereas V=2.975 for 0.98 μm wavelength resulting in multimode operation. However with proper design, a wide range of wavelength from visible to infrared can be propagated either as single mode or multimode.

It is to be noted with respect to Eq. (1) above that when B=A, the effective index of refraction $\eta_{\mathit{eff}}$ is 1.25 while for B=2A, $\eta_{\mathit{eff}}$ is 1.16. In accordance with a preferred embodiment, an effective index $\eta_{\mathit{eff}}$ approaching 1 is achieved by maximizing the ratio of air gap to silica material in the cross-section of the light-guiding portion of the optical fiber. According to a preferred embodiment, it is preferable to maintain a fiber optic cross-section having a large proportion of its area dedicated to air voids in both the core region and the cladding region. The light waves will accordingly "see" less glass material as they propagate down the longitudinal axis of the fiber, resulting in increased transmission efficiency (reduced signal attenuation, reduced dispersion effects, reduced nonlinear effects, and increased transmission velocity) as compared to conventional, solid index-guiding optical fibers. Although the air void to cross-section ratio of the above example (25% for the core, 25.99% for the cladding) yields good results, it is found to be even more desirable for this ratio to be greater than 50% for each of the core and cladding regions. In solid-core and solid-cladding prior art optical fibers in which the refractive index is approximately 1.5, the velocity of propagation is approximately c/1.5, where c is the speed of light in a vacuum. When the air void to cross-section ratio is greater than 50% in accordance with a preferred embodiment, the effective refractive index will be less than 1.25 and, advantageously, the velocity of propagation will be greater than c/1.25, which represents at least a 20% increase in propagation velocity as compared to solid-core and solid-cladding prior art optical fibers.

Importantly, provided that they are very small compared to the wavelength of light being transmitted, the dimensions of the optical fiber microstructures may vary widely without departing from the scope of the preferred embodiments. For instance, the size of the individual tubular elements may even be an order of magnitude less than the above dimensions. Thus, the core tubes may have an outside diameter of 0.01 μm and an inside diameter of 0.005 μm while the cladding tubes may have an outside diameter of 0.0102 μm and an inside diameter of 0.0052 μm. If the overall dimensions of the optical fiber are kept the same, i.e., a core diameter of 8 μm and outside cladding diameter of 125 μm, similar transmission results may be achieved. It should be noted that the core size of 8 μm is taken as an example and the core size can be varied depending on the index difference between the core and the cladding. Also, for multimode applications, core diameters of 50 to 62 micrometers are commonly used in conventional optical fibers and similarly can be implemented in accordance with the preferred embodiments.

The cross-sectional positioning of the tubular structures 204 and 210 of FIG. 2 may be amorphous or periodic, provided that the effective index of refraction is uniformly distributed at any particular location. The optical fiber 200 may comprise sets of capillary-like tubes or other structures that are bundled together as in FIG. 2, or may alternatively comprise a unitary piece of fused silica or other fiber optic material into the void regions are etched out, as will be shown infra.

In addition to having increased transmission efficiency, a microstructured optical fiber in accordance with the preferred embodiments exhibits improved physical durability and robustness. Because of the very small size of the void regions and accordingly higher spatial density of voids, if the optical fiber is pinched or squeezed at a given point, the outer void regions preferably will deform to absorb the pinching pressure and leave the inner voids substantially unchanged. This preferably will avoid unwanted polarizations or other adverse effects exhibited by solid fused silica when subjected to such stresses in conventional optical fibers. Moreover, the small void regions serve to mechanically inhibit the propagation of microcracks into the cladding or core from the outer perimeter of the fiber, providing increased robustness to external bending of the optical fiber.

It is to be appreciated that although fused silica material is used in the above examples, the material could be a different material such as a polymer as currently used in plastic optical fibers. Advantageously, the known problems with severe transmission losses in plastic optical fibers may be significantly reduced if the microstructure of FIG. 2 is used, thereby making plastic optical fiber a more realistic alternative. Other material that may be used includes lithium niobate fibers, III-V material such as gallium nitride, or other materials.

Figure 3:
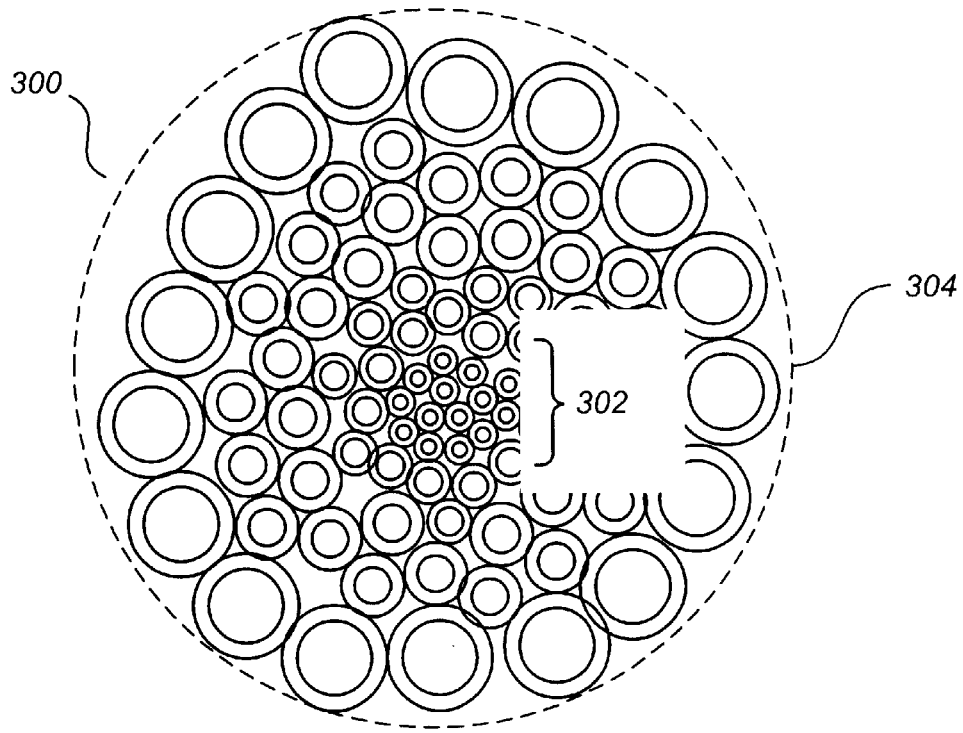
FIG. 3 illustrates a cross-section of a microstructured graded-index optical fiber in accordance with a preferred embodiment.

FIG. 3 illustrates a cross-section of a microstructured graded-index optical fiber 300 in accordance with a preferred embodiment. Optical fiber 300 comprises a series of tubular structures that are gradually graded from having a lower air-to-cross-section ratio near the center of a core region 302 to having a higher air-to-cross-section ratio as the radius increases into a cladding region 304. Index-guiding is achieved through the steadily decreasing effective index of refraction as the radius increases. Specific graded-index profiles known in the art may be achieved by adjusting the dimensions of the tubular structures.

Figure 4:
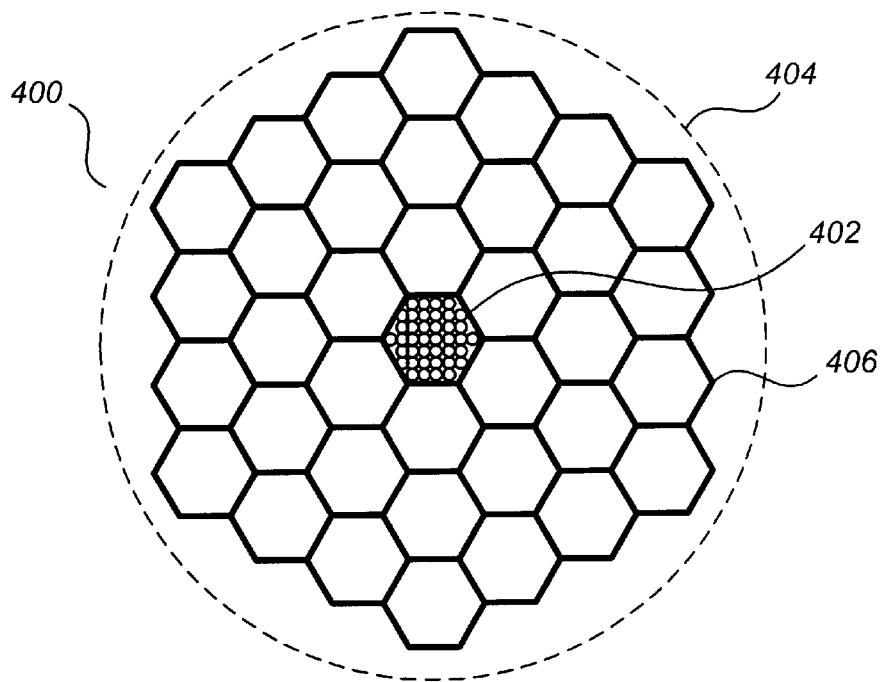
FIG. 4 illustrates a cross-section of an optical fiber in accordance with a preferred embodiment.

FIG. 4 illustrates a cross-section of an optical fiber 400 in accordance with a preferred embodiment, comprising a core region 402 having circular holes and a cladding region 404 comprising hexagonal honeycomb structures 406. As disclosed supra, it is desirable to remove as much core and cladding material as possible to increase the air void to cross-section ratio for increasing transmission efficiency. In order to remove as much material as possible, polygonal structures can be used for the cladding layers, while circular holes may still be used in the core region. With proper dimensioning analogous to that disclosed supra with respect to FIG. 2, this combination of circular holes and polygonal holes can be used to achieve the desired index of refraction for the core region and the cladding region.

Figure 5:
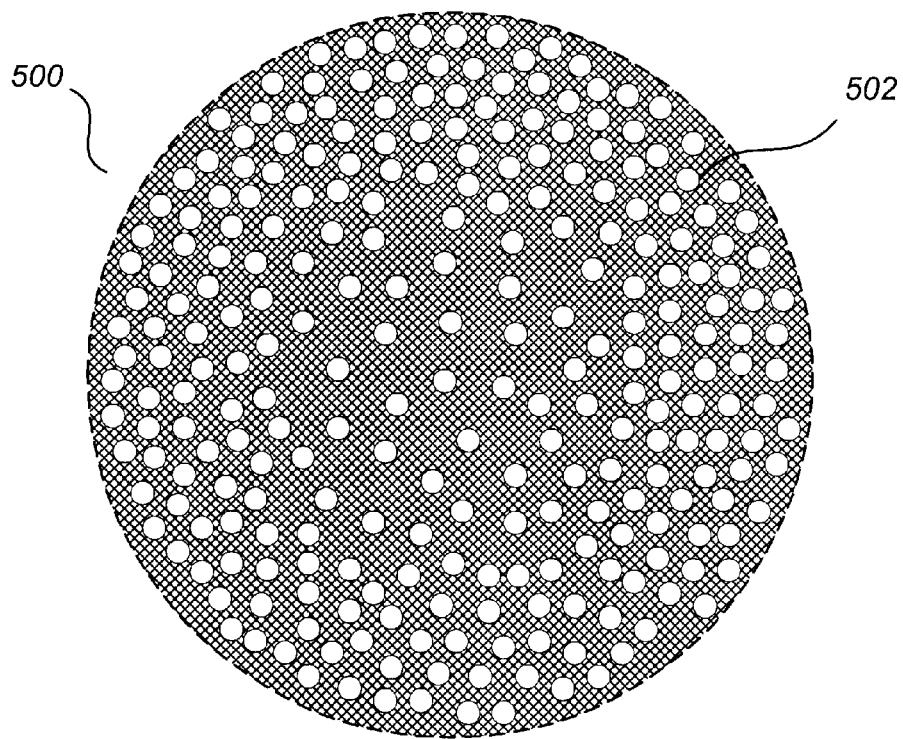
FIG. 5 illustrates a cross-section of an optical fiber in accordance with a preferred embodiment.

FIG. 5 illustrates a cross-section of an optical fiber 500 in accordance with a preferred embodiment. It is to be appreciated that the effective index of refraction can be accomplished by either varying the density and diameter of the hollow silica tubes or structures (as in FIGS. 2–4) or by varying the density of the tubes and keeping the diameter constant. This is illustrated by the example of FIG. 5, in which constant-diameter holes 502 are placed at varying densities across the cross-section of the optical fiber 500. By way of nonlimiting example, the diameter of the holes 502 is less than 0.3 $\mu$m. It is even more preferable, however, for the diameter of the holes 502 to be less than 0.1 $\mu$m. In this example, the core region will have a greater amount of silica material and the cladding region will have a lesser amount of silica material and an index-guiding effect will be achieved.

Figure 6:
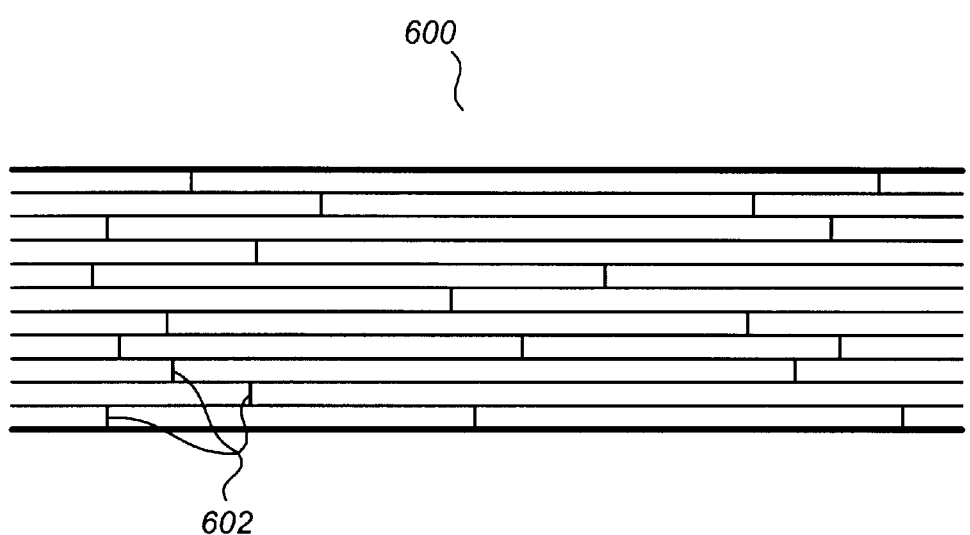
FIG. 6 illustrates a longitudinal cross-section of an optical fiber in accordance with a preferred embodiment.

FIG. 6 illustrates a longitudinal cross-section of an optical fiber 600 in accordance with a preferred embodiment, wherein each elongated air void is intermittently pinched off in the longitudinal direction at various locations 602. This prevents capillary-like flooding of the optical fiber if there is an unintended introduction of water, water vapor, or other fluid or fluid vapors into the fiber. Preferably, as indicated in FIG. 6, the longitudinal positionings of the intermittent pinches are randomly distributed among the air voids when considered in cross-section. Accordingly, light waves propagating down the fiber will not be reflected or otherwise substantially affected as might happen if the pinches occurred in common longitudinal locations. In accordance with an alternative embodiment, the longitudinal positionings of the intermittent pinches may be distributed in a periodic fashion such that reflections are reduced by interference effects.

Figure 7:
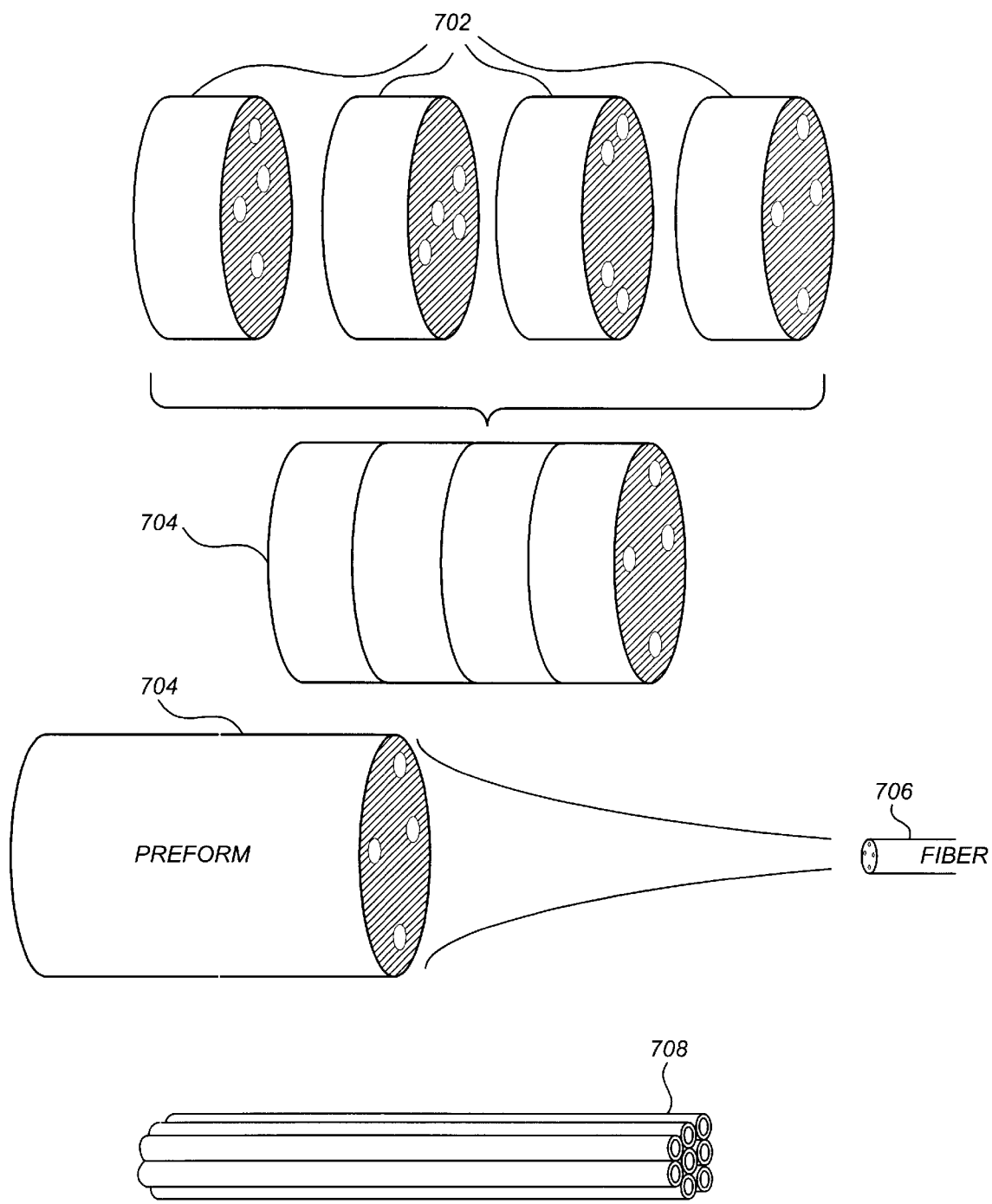
FIG. 7 illustrates steps that may be taken in manufacturing a microstructured optical fiber in accordance with a preferred embodiment.

FIG. 7 illustrates steps that may be taken in manufacturing a microstructured optical fiber in accordance with a preferred embodiment. Certain manufacturing methods relating to different types of fiber structures that also may be applicable here are provided in U.S. Pat. No. 5,802,236 and WO9964903, supra, alternatively or in conjunction with the steps provided herein. Generally speaking, however, a variety of known techniques may be used to manufacture microstructured optical fibers in accordance with the preferred embodiments.

In conventional fibers (see, e.g., G. Keiser, *Optical Fiber Communication,* 2nd Ed., McGraw Hill (1991) at pp. 63 et. seq., the contents of which are hereby incorporated by reference into the present disclosure) a fiber preform is first fabricated with the desired refractive index variations and geometric aspect ratios. The preform is then drawn to a fiber of approximately 130 $\mu$m in diameter from a preform that can be 10 cm in diameter or larger. This is a reduction in diameter by approximately 750 times. Using similar methods, preforms for the optical fiber of the preferred embodiments can be fabricated from silica material in disks 702 with voids drilled in the disks. The voids can be approximately 750 times bigger than the final hole in the optical fiber. For example, 0.01 $\mu$m holes in the final product can result from 7.5 $\mu$m holes in the preform, which can easily be fabricated using known laser ablation techniques. The preforms may be fabricated in a series of disks 702 whose thicknesses can be from 100 $\mu$m to several centimeters depending on the size of the voids to be created. The voids can be created using laser ablation as mentioned above, or plasma etching using masks to define the size and position of the voids. The voids need not be all in the same position for each disk 702, and indeed one purpose of varying the positions of the voids is to limit the length of each void. Once the disks are fabricated, they can be grouped together and fused into a single preform 704. The preform 704 is then heated locally and a single strand of fiber 706 is pulled therefrom.

In an alternative manufacturing method, the optical fiber of the preferred embodiments may be generated by separately generating hollow tubes of desired dimension, by pulling a disk 702 that has a single hole in the center. After being pulled, the hollow tubes can be appropriately stacked, bunched together (see FIG. 7 element 708), and coated to form the desired optical fiber. The bundle of hollow tubes can be pinched at random or periodic lengths at the preform stage prior to pulling into fibers. Pinched tubes at the preform stage can be stacked and fused prior to pulling.

In alternative preferred embodiments, the air voids of the optical fiber can be filled in whole or in part with an electro-optic and/or electro-active material such as liquid crystal to make a coupler or amplifier, and magnetic materials for making isolators or circulators. Certain sections of the air voids can also be patterned to fabricate fiber gratings, or a segment of the air voids can be made from material that is more conducive for grating patterning. In addition, the core material or cladding material itself need may depart from pure homogenous silica, and may be doped with impurities such as erbium for amplification, or may be of different geometries for polarization preservation. In these cases, local uniformity of the refractive index is not preserved, so as to achieve special functionality with the optical fiber such as optical coupling, polarization maintaining, amplification, and Bragg grating to name a few.

Other features and advantages are enjoyed by an optical fiber in accordance with the preferred embodiments. With less silica material used, the optical fiber of the preferred embodiments can have a refractive index that is close to 1, whereas for conventional fiber the refractive index is approximately 1.5. Hence, the optical fiber of the preferred embodiments can transport optical signals faster than the conventional fiber. Moreover, by varying the density of the hollow silica tubes, the velocity of light can be varied. The reduced silica material in the hollow silica tubes can translate to a greater uniformity (whereas non-uniformity of conventional fibers are due mostly to variation in material and diameter), hence resulting in a fiber that can be used for solitons, and other applications where fiber homogeneity is important. Massive parallel interconnects for computers require a very homogenous fiber where skew is important. In addition, the optical fiber of the preferred embodiments can have numerical aperture tailoring, and because it uses less silica material, it is lighter in weight.

Moreover, because the optical fiber of the preferred embodiments exhibits reduced loss and dispersion, it can be used over a wider spectrum. More particularly, the optical fiber of the preferred embodiments should be capable of operating as a long haul (>100 km) segment at a wide range of infrared wavelengths (e.g., between 1300–1600 nm), and should be capable of operating as a short haul (<50 km–100 km) segment at an even wider range of visible and infrared wavelengths (e.g., between 650–1600 nm).

Moreover, the disks 702 (see FIG. 7)—and therefore the resulting fiber optical structure—can be either made of uniform silica material or with doped refractive-index core and cladding to assist in the guiding of the lightwave together with the effective index effect. The use of a traditional optical fiber geometry with a refractive index core and a cladding, together with air voids in accordance with the preferred embodiments to enhance the guiding and reduce the amount of silica material in the optical fiber, may be advantageous in reducing the theoretical loss due to Rayleigh scattering, since the amount of silica material is less in an optical fiber with voids. In addition, for single mode operation, chromatic dispersion can be reduced with the addition of voids since less silica meterial is used. Waveguide dispersion which is due to the ratio of the optical power in the core and cladding varying as a function of wavelength can also be significantly reduced by the placement of the voids in the cladding region.

The reduction in optical loss, dispersion and non-linearities enjoyed by optical fibers of the preferred embodiments result in the several advantages for an optical network, including, but not limited to: greater usable bandwidth of the fiber; channel spacing in a wavelength division multiplexed (WDM) system can be relaxed thereby reducing the cost of the system; higher optical power can be utilized resulting in greater distances between amplifiers and repeaters; with reduced dispersion and non-linearities, closer channel spacings can be supported thereby increasing the capacity of the fiber; and, potentially, a single fiber of the preferred embodiment could replace several conventional fibers.

Another advantage of the optical fiber of the preferred embodiments is increased immunity to radiation darkening. The radiation darkening of a fiber basically renders the fiber "opaque" to light. Conventional optical fiber suffers from radiation darkening, hence its use in a nuclear environment is limited. Although still somewhat susceptible to radiation darkening, the optical fiber of the preferred embodiments uses a significantly less amount of silica, and therefore its optical loss should be less than that of a comparably radiation darkened conventional fiber.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments are not intended to limit their scope, which is limited only by the scope of the claims set forth below.

What is claimed is:

1. An optical fiber for propagating light in a longitudinal direction according to an index guiding effect comprising:
    a microstructured core comprising a plurality of hollow, longitudinally extending core cells formed by core material, the core material occupying a first percentage of a cross-section of said microstructured core;
    a microstructured cladding surrounding the microstructured core, said microstructured cladding comprising a plurality of hollow, longitudinally extending cladding cells formed by cladding material, the cladding material occupying a second percentage of a cross-section of said microstructured cladding;
    wherein said first percentage is greater than said second percentage for causing said microstructured core to have a higher effective index of refraction than said microstructured cladding for allowing index-guiding of light waves through the optical fiber; and
    wherein said core cells and cladding cells are intermittently pinched off in the longitudinal direction, thereby preventing capillary-effect flooding of the optical fiber upon unintended introduction of external fluid into the optical fiber.

2. The optical fiber of claim 1, wherein longitudinal positioning of the intermittent pinches are randomly distributed among the core cells and cladding cells.

3. The optical fiber of claim 2, wherein longitudinal positioning of the intermittent pinches are periodically distributed among the core cells and cladding cells.

4. An optical fiber comprising:
    a core region surrounding longitudinal axis of the optical fiber, said core region comprising a core material having a plurality of void regions interposed therein, said void regions being elongated and parallel to the center longitudinal axis, said void regions occupying a first percentage of the area of a cross-section of the core region; and
    a cladding region surrounding said core region, said cladding region comprising a cladding material with a plurality of void regions interposed therein, said void regions being elongated and parallel to the center longitudinal axis, said void regions occupying a second percentage of the area of a cross-section of the cladding region, said second percentage being greater than said first percentage;
    whereby said cladding region has a lower effective index of refraction than said core region for allowing propagation of light waves through the optical fiber by an index-guiding effect; and
    wherein the largest cross-sectional dimension of any structure in the core microstructure less than 20% of the wavelength of light being propagated through the optical fiber.

5. The optical fiber of claim 4, said cladding material forming a cladding microstructure comprising a plurality of hollow, adjacently touching structures, each structure forming an inner void region therein and a plurality of outer void regions in conjunction with neighboring structures, wherein said inner and outer void regions collectively comprise said second percentage of the cross-sectional area of the cladding region, and wherein the largest cross-sectional dimension of any structure in the cladding microstructure is less than 20% of the wavelength of light being propagated through the optical fiber.

6. The optical fiber of claim 5, wherein said core structures and cladding structures are intermittently pinched off in the longitudinal direction, thereby preventing capillary-effect flooding of the optical fiber upon unintended introduction of external fluid into the optical fiber.

7. The optical fiber of claim 6, wherein the longitudinal positioning of the intermittent pinches is randomly distributed among said core and cladding structures.

8. The optical fiber of claim 6, wherein the longitudinal positioning of the intermittent pinches is periodically distributed among said core and cladding structures.

9. The optical fiber of claim 5, wherein said core region structures and said cladding region structures are arranged amorphously across the cross sections of the core region and cladding region, respectively.

10. The optical fiber of claim 5, wherein said core region structures and said cladding region structures are arranged periodically across the cross sections of the core region and cladding region, respectively.

11. The optical fiber of claim 10, wherein said core region structures are substantially uniform in shape and size, and wherein said cladding region structures are substantially uniform in shape and size.

12. The optical fiber of claim 11, wherein said core and cladding materials have refractive indices near 1.5, wherein said core region structures comprise cylindrical tubes having outside and inside diameters near 0.1 $\mu$m and 0.05 $\mu$m, respectively, and wherein said cladding region structures comprise cylindrical tubes having outside and inside diameters near 0.102 $\mu$m and 0.052 $\mu$m, respectively, whereby said core region has an effective index of refraction of 1.3750 and said cladding region has an effective index of 1.3701 for allowing an index-guiding effect for propagating light waves down said fiber due to the 0.356% difference in effective index of refraction.

13. The optical fiber of claim 12, wherein said core region has a diameter near 8 $\mu$m and said cladding region has an outside diameter near 125 $\mu$m for single-mode propagation of light at 1.3 $\mu$m to 1.55 $\mu$m through the optical fiber.

14. A microstructured optical fiber for propagating light in a longitudinal direction, said microstructured optical fiber comprising a light-confining region disposed around a center longitudinal axis, said light-confining region comprising a fiber optic material having a plurality of air voids interposed therein, said air voids being elongated and parallel to the center longitudinal axis, wherein each of said air voids is intermittently pinched off in the longitudinal direction, thereby preventing capillary-effect flooding of the optical fiber upon unintended introduction of external fluid into the optical fiber.

15. The optical fiber of claim 14, wherein the longitudinal positioning of the intermittent pinches is randomly distributed among the air voids.

16. The optical fiber of claim 14, wherein the longitudinal positioning of the intermittent pinches is periodically distributed among the air voids.

17. An optical fiber for propagating light in a longitudinal direction according to an index guiding effect, comprising:
  a microstructured core comprising a plurality of hollow, longitudinally extending core cells formed by core material, the core material occupying a first percentage of a cross-section of said microstructured core;
  a microstructured cladding surrounding the microstructured core, said microstructured cladding comprising a plurality of hollow, longitudinally extending cladding cells formed by cladding material, the cladding material occupying a second percentage of a cross-section of said microstructured cladding;
  wherein said first percentage is greater than said second percentage for causing said microstructured core to have a higher effective index of refraction than said microstructured cladding for allowing index-guiding of light waves through the optical fiber; and
  wherein an average cross-sectional dimension of said core cells and cladding cells is less than 0.1 $\mu$m, and wherein said core cells and cladding cells are amorphously arranged with respect to a cross-section of said optical fiber.

18. An optical fiber for propagating light in a longitudinal direction according to an index guiding effect, comprising:
  a microstructured core comprising a plurality of hollow, longitudinally extending core cells formed by core material, the core material occupying a first percentage of a cross-section of said microstructured core;
  a microstructured cladding surrounding the microstructured core, said microstructured cladding comprising a plurality of hollow, longitudinally extending cladding cells formed by cladding material, the cladding material occupying a second percentage of a cross-section of said microstructured cladding;
  wherein said first percentage is greater than said second percentage for causing said microstructured core to have a higher effective index of refraction than said microstructured cladding for allowing index-guiding of light waves through the optical fiber; and
  wherein an average cross-sectional dimension of said core cells and cladding cells is less than 0.1 $\mu$m.

19. The optical fiber of claim 18, wherein a collective cross-section of said microstructured core and microstructured cladding is more than 50% hollowed area.

20. The optical fiber of claim 19, wherein the cross-section of the microstructured core is more than 50% hollowed area.

21. The optical fiber of claim 20, wherein the cross-section of the microstructured cladding is more than 50% hollowed area.

22. An optical fiber for propagating light in a longitudinal direction according to an index guiding effect comprising:
  a microstructured core comprising a plurality of hollow, longitudinally extending core cells formed by core material, the core material occupying a first percentage of a cross-section of said microstructured core;
  a microstructured cladding surrounding the microstructured core, said microstructured cladding comprising a plurality of hollow, longitudinally extending cladding cells formed by cladding material, the cladding material occupying a second percentage of a cross-section of said microstructured cladding;
  wherein said first percentage is greater than said second percentage for causing said microstructured core to have a higher effective index of refraction than said microstructured cladding for allowing index-guiding of light waves through the optical fiber; and
  wherein no substantial number of core or cladding cells has a cross-sectional dimension greater than 0.3 $\mu$m in a substantial portion of said optical fiber.

23. An optical fiber comprising:
  a core comprising a first material and a second material in phases distinct from each other, said core having a first effective refractive index; and
  a cladding surrounding said core and comprising a third material and a fourth material in phases distinct from each other, said cladding having a second effective refractive index;

wherein said first refractive index is greater than the second refractive index and said optical fiber transmits light by an index-guiding effect; and in which the first and third materials are continuous along the length of the optical fiber whereas the second and fourth materials comprise individual elongated portions extending along the length of the optical fiber.

24. An optical fiber for propagating light in a longitudinal direction according to an index guiding effect, comprising:
a microstructured core comprising a plurality of hollow, longitudinally extending core cells formed by core material, the core material occupying a first percentage of a cross-section of said microstructured core;
a microstructured cladding surrounding the microstructured core, said microstructured cladding comprising a plurality of hollow, longitudinally extending cladding cells formed by cladding material, the cladding material occupying a second percentage of a cross-section of said microstructured cladding;
wherein said first percentage is greater than said second percentage for causing said microstructured core to have a higher effective index of refraction than said microstructured cladding for allowing index-guiding of light waves through the optical fiber; and
wherein an average cross-sectional dimension of said core cells and cladding cells is less than 0.1 $\mu$m, and wherein said core cells and cladding cells are periodically arranged with respect to a cross-section of said optical fiber.

25. The optical fiber of claim 24, wherein said core cells and cladding cells are tubular in shape.

26. The optical fiber of claim 24, wherein said core cells are cylindrically tubular in shape, and wherein said cladding cells are hexagonally shaped in the cross-sectional direction.

27. The optical fiber of claim 24, wherein said optical fiber is configured and dimensioned to propagate light at a velocity that is greater than c/1.25, where c is the velocity of light in a vacuum.

28. An optical fiber comprising:
a core comprising a first material and a second material in phases distinct from each other, said core having a first effective refractive index; and
a cladding surrounding said core and comprising a third material and a fourth material in phases distinct from each other, said cladding having a second effective refractive index;
wherein said first refractive index is greater than the second refractive index and said optical fiber transmits light by an index-guiding effect; and
in which said first material is in the form of tubular structures that have polygonal cross-sections and said second material is in said tubular structures.

29. An optical fiber comprising:
a core comprising a first material and a second material in phases distinct from each other, said core having a first effective refractive index; and
a cladding surrounding said core and comprising a third material and a fourth material in phases distinct from each other, said cladding having a second effective refractive index;
wherein said first refractive index is greater than the second refractive index and said optical fiber transmits light by an index-guiding effect; and
in which said first and third material form a continuous phase matrix and said second and fourth materials occupy voids in said matrix.

30. An optical fiber, comprising:
a core region surrounding a center longitudinal axis of the optical fiber, said core region comprising a core material having a plurality of void regions interposed therein, said void regions being elongated and parallel to the center longitudinal axis, said void regions occupying a first percentage of the area of a cross-section of the core region; and
a cladding region surrounding said core region, said cladding region comprising a cladding material with a plurality of void regions interposed therein, said void regions being elongated and parallel to the center longitudinal axis, said void regions occupying a second percentage of the area of a cross-section of the cladding region, said second percentage being greater than said first percentage;
whereby said cladding region has a lower effective index of refraction than said core region for allowing propagation of light waves through the optical fiber by an index-guiding effect; and
wherein the ratio of void area to material area is greater than 1:1 in a cross-section of at least one of said core region and cladding region.

31. An optical fiber as in claim 30 in which the ratio is greater than 1:1 in said core region.

32. An optical fiber as in claim 30 in which the ratio is greater than 1:1 in said cladding region.

33. An optical fiber as in claim 30 in which the ratio is greater than 1:1 in each of said core and cladding regions.

34. A method of making an optical fiber comprising:
fabricating disc-shaped individual preforms of a first material, each individual preform having axially extending portions of a second material included therein;
stacking a number of said individual preforms to form a combined preform in which said elongated portions of the second material in each of the individual preforms extend generally in the same direction but generally are offset from those of adjacent individual preforms;
drawing the combined preforms to form an optical fiber in which an effective index of refraction in a core portion is greater than an effective index of refraction in a cladding portion that surrounds the core portion, and each of the core and cladding comprise said first material and elongated portions of said second material.

35. A method as in claim 34 in which the first material comprises glass and the second material comprises air.

* * * * *